May 22, 1962 J. H. HALL 3,036,249
CAPACITOR
Filed Aug. 5, 1957
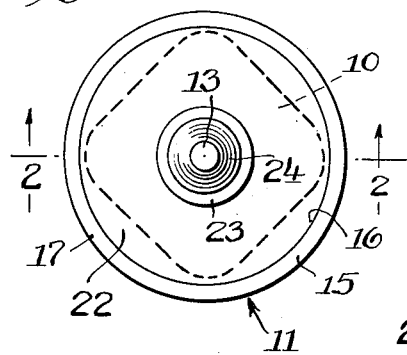
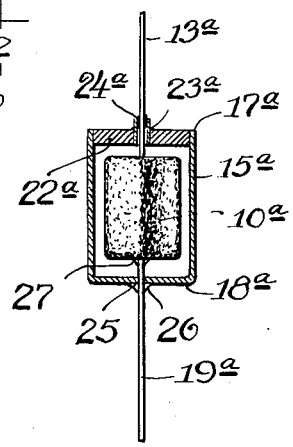
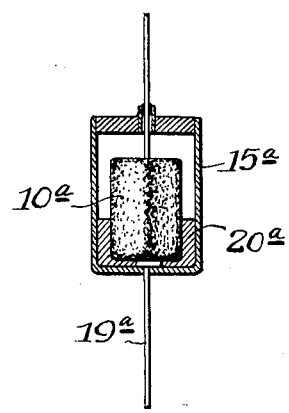
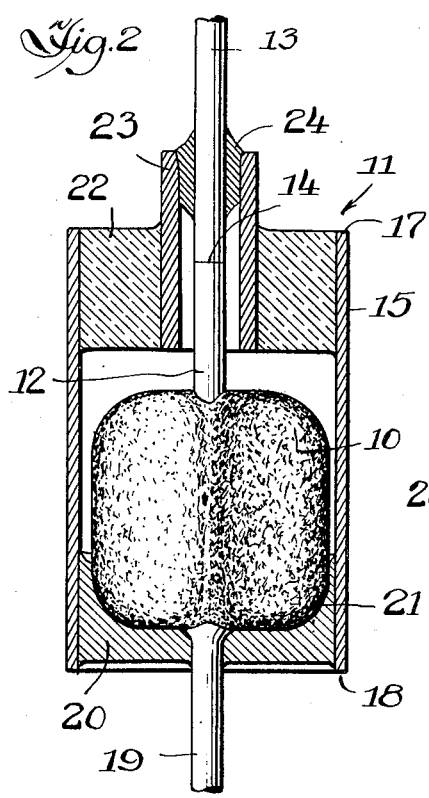
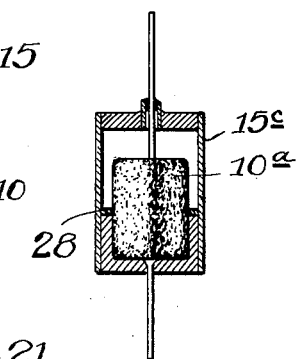
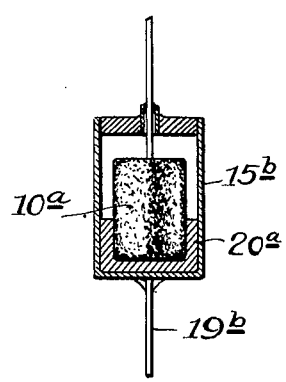
Inventor
James H. Hall,
By: Schneider, Dressler & Goldsmith,
Attys.

United States Patent Office 3,036,249
Patented May 22, 1962

3,036,249
CAPACITOR
James H. Hall, Lake Bluff, Ill., assignor to Fansteel
Metallurgical Corporation, a corporation of New York
Filed Aug. 5, 1957, Ser. No. 676,145
7 Claims. (Cl. 317—230)

The present invention relates to a capacitor and more particularly to a capacitor of the type having a solid or dry electrolyte. Still more particularly, the present invention is concerned with enclosures for solid or dry electrloyte-type capacitors and a method of protecting such capacitors from physical shocks, atmospheric conditions and contaminating liquids and gases.

Dry or solid electrolyte-type capacitors such as tantalum capactiors having a tantalum anode with an oxide film thereon over which there is a coating of mixed oxides of manganese, have become very popular in installations where space and weight and accuracy are critical. Capacitors of this type are extremely light weight, very small, and have a high reactance to resistance ratio.

As a general rule, these capacitors are made by oxide forming a porous tantalum anode, such as a sintered tantalum anode, to which there has been connected a tantalum wire lead. After the tantalum anode is formed it is dipped in manganese nitrate. The unit is then fired or heated to a high temperature to reduce the manganese nitrate to mixed oxides of manganese, herein referred to as "manganese oxide." The dipping and heating steps may be repeated several times to insure proper coating of the filmed anode with manganese oxide. After final coating, the tantalum anode with the manganese oxide coating thereon is reformed to insure continuity of the oxide film on the tantalum under the manganese oxide electrolyte. The element is then coated with a conductive coating, as by painting, spraying or dipping to form the second electrode, i.e., the cathode and a lead wire is connected to the conductive coating as by soldering.

Solid or dry electrolyte, tantalum capacitors of the type described above are extremely fragile and delicate. The manganese oxide coating is especially fragile. Physical shock often results in fracture of coating and may cause disengagement of the cathode lead wire and fracture of the tantalum oxide film.

It has also been discovered that exposure to the atmosphere or to corrosive fluids may affect the capacitive qualities of the capacitor.

By the present invention these difficulties are overcome. The present invention provides for enclosure of a capacitor of this type in a case that protects the capacitor from mechanical shock and seals the capacitor against atmospheric and other fluid corrosion. Previous enclosures did not sufficiently provide either type of protection.

In accordance with this invention a solid tantalum capacitor, i.e., a solid electrolyte-type capacitor with a tantalum anode as described herein, may be sealed in a steel case by sealing the case with a seal which provides a hermetic seal and which insulates the anode from the case. The cathode may be connected directly to the case for firm mounting on the case and protection against mechanical shock.

Numerous features of the present invention and variations thereof within the scope of the invention will become readily apparent from the following detailed description of the invention and embodiments thereof, from the claims, and from the accompanying drawings in which each and every detail shown is fully and completely disclosed as a part of this specification, in which like reference numerals refer to like parts, and in which:

FIGURE 1 is a plan view of a capacitor encased in accordance with this invention;

FIGURE 2 is a full section view of the capacitor of FIG. 1 viewed substantially along the line II—II;

FIGURE 3 is a view like FIG. 2 showing another embodiment of the invention;

FIGURE 4 is a view like FIG. 2 showing still another embodiment of the invention.

FIGURE 5 is a view like FIG. 2 showing still another embodiment of the invention; and FIGURE 6 is a view like FIG. 2 showing still another embodiment of the invention.

In the embodiment of the invention illustrated in FIGS. 1 and 2 there is shown a solid tantalum capacitor 10 sealed in an enclosure indicated generally at 11. The capacitor 10 is of the type described hereinabove wherein a porous tantalum anode is oxide formed, dipped in manganese nitrate fired and heat treated to reduce the manganese nitrate to manganese oxide, cooled, reformed, and coated with a cathode material. The coatings over the tantalum are extremely fragile and subject to fracture by mechanical shock or vibration and subject to atmospheric and corrosive fluid damage.

The capacitor 10 of FIGS. 1 and 2 is provided with a tantalum lead wire 12 secured directly to the tantalum anode, as by welding or as a part of the anode with the tantalum sintered thereabout. The tantalum lead wire 12 is usually short and has a second, longer lead wire 13 of any desired length welded or brazed or soldered thereto as at 14. This extension lead wire 13 may be made of any desired material; nickel wire is often selected for this purpose.

While the shape of the capacitor 10 is not critical it usually has a more or less rectangular configuration with rounded corners as shown in FIGS. 1 and 2.

The capacitor is disposed within a protective case or shell 15 which is preferably annular although it may have any desired configuration. The inside diameter of the case 15 is sufficiently large to provide at least a small clearance between its inside surface 16 and the outer surface of the capacitor. In the embodiment of FIGS. 1 and 2, the case 15 is a short length of steel tube having an inside diameter sligthly greater than the maximum transverse dimension of the capacitor 10. The capacitor 10 is coaxially arranged in the case 15 with the lead wires extending beyond the ends 17 and 18 of the case.

The cathode lead 19 may have been secured to the capacitor 10 previously but that is not necessary since, in this embodiment of the invention, the sealing of the cathode end of the case will provide a strong mechanical and good electrical connection between the cathode coating on the outer surface of the capacitor and the lead wire 19. The cathode end 18 of the case is then filled with lead-tin or other desired solder, as shown at 20, for a substantial distance along the length of the capacitor 10 with the lead 19 in place against the cathode face of the capacitor. The case extends a short distance beyond the end face 21 of the capacitor so that the end of the capacitor is completely covered with solder that is within the case.

At the anode end 17 of the case, there is provided a hermetic compression seal such as a glass-like seal 22 provided with a central lead receiving tube 23 made of steel or other suitable material. The sealing material 22 provides a hermetic seal between the outer surface of the anode lead tube 23 and the inner surface 16 of the encasing tube 15.

The tantalum lead wire 12 and the lead wire 13 extend coaxially through the lead tube 23 and are soldered thereto as at 24 by a lead-tin or other suitable solder which provides a final closure seal for the capacitor within the enclosure case.

A solid electrolyte-type capacitor encased in this manner is fully protected against ordinary mechanical shock, vibrations and atmospheric and other fluid corrosion. If desired, the remaining void space between the compression seal 22 and the capacitor 10 and the solder seal 20 may be filled with such a shock absorbing material such as an epoxy resin or other suitable insulating and shock absorbing material.

In the embodiment of the invention illustrated in FIG. 3, the capacitor 10a is enclosed in a cup-shaped case 15a of steel or other suitable material and provided with an open end 17a and a closed end 18a. The closed end 18a has a central aperture 25 to receive the cathode lead wire 19a. The lead wire 19a is soldered to the case at 26 and soldered to the cathodic outer coating on the capacitor at 277. The anodic lead 13a extends through and is sealed to a lead tube 23a by solder at 24a. The lead tube 23a is sealed to the inner surface of the case 15a at open end 17a thereof by a hermetic seal 22a corresponding to the seal 22 in FIGS. 1 and 2. The space between the capacitor 10a and the inside of the case 15a may be filled with an insulating and shock absorbing material as described above, prior to final sealing.

The embodiments of FIGS. 5 and 6 are similar to the embodiments of FIG. 3 except that in the embodiment of FIG. 5 the closed end of the cup-shaped case 15a is filled with solder 20a which extends along the side of the capacitor 10a for a substantial distance. The solder 20a may serve to seal the closed end of the case as well as to connect the lead 19a to the capacitor 10a. In the embodiment of FIG. 6 the closed end of the cup 15b, which is like the cup 15a, is not apertured for passage of the cathode lead. Instead a cathode lead 19b is soldered to the bottom of the case for connection to the cathode through the case and through the solder 20a which fills the bottom of the case. The solder 20a in the bottom of the case provides a firm mechanical connection and good electrical contact between the case 15b and the capacitor 10a.

The seal at the upper end of each of the cases 15a and 15b of FIGS. 5 and 6 is the same as that shown in FIGS. 1, 2 and 3 as described above.

In the embodiment of the invention shown in FIG. 4 the capacitor 10a is sealed in a tubular case 15c which may be the same as tubular case 15 in the embodiment of FIGS. 1 and 2. This embodiment of the invention is substantially the same as that shown in FIGS. 1 and 2 except that there is provided a stop-off washer 28 about the side faces of the capacitor 10a engaging the capacitor and engaging the inside face of the tubular casing 15c. This stop-off washer is operative as a solder stop and limits the flow of solder that seals the cathode end of the protective case and of the capacitor up the sides of the capacitor.

From the foregoing it will be observed that numerous modifications and variations may be effected without departing from the true spirit and scope of the novel concepts and principles of this invention.

I claim:

1. In combination with a capacitor of the dry electrolyte type, a metallic enclosure case disposed about the capacitor, means closing an end of said case and providing for electrical connection to the cathode of said capacitor, and means at the other end of said case hermetically sealing the same and providing for electrical connection with the anode of said capacitor, said case having a cup shape with a solder connection between the bottom of the case and the outer surface of the capacitor and a glass-like hermetic seal at the open end of the case insulating the case from the capacitor.

2. The combination claimed in claim 1 in which the closed end of the cup-shaped case is filled with solder which extends along the side of the capacitor for a substantial distance.

3. The combination claimed in claim 1 in which electrical connection with the cathode of said capacitor is provided by a cathode lead soldered to the bottom of said case.

4. The combination claimed in claim 1 in which electrical connection with the cathode of said capacitor is provided by a cathode lead which extends through an aperture in the bottom of said case.

5. In combination with a capacitor of the dry electrolyte type having an anode lead extending therefrom and a cathode lead connected to the outer surface thereof, an enclosure comprising a metallic tube disposed about the capacitor, solder in one end of the tube sealing the end of the tube and providing a rigid connection between the cathode lead, the outer surface of the capacitor and the inner surface of the case, a glass-like hermetic seal at the other end of the case, and an anode lead tube in said glass-like hermetic seal and extending therethrough, the anode lead of said capacitor extending through said lead tube, and solder sealing the lead tube with the anode lead extending therethrough.

6. In combination with a capacitor of the dry electrolyte type having a filmed anode with a dry electrolyte thereon and a cathode coating over the electrolyte, an enclosure to protect the capacitor against corrosion and mechanical shock and vibration, comprising a metal tube disposed about the capacitor, a lead wire connected to the cathode coating on the capacitor and extending beyond one end of the tube, a solder seal in said one end of said tube, a glass-like seal in the other end of said tube, a metallic anode lead tube extending through said hermetic seal, an anode lead connected to the anode of said capacitor and extending through said lead tube, and a solder seal between said anode lead and said lead tube.

7. In combination with a capacitor of the dry electrolyte type, a metallic enclosure case disposed about the capacitor, means closing an end of said case and providing for electrical connection to the cathode of said capacitor, and means at the other end of said case hermetically sealing the same and providing for electrical connection with the anode of said capacitor, said case having a cup shape with a solder connection between the bottom of the case and the outer surface of the capacitor and providing an electrically conductive connection therebetween, and a glass-like hermetic seal at the open end of the case insulating the case from the capacitor.

References Cited in the file of this patent

UNITED STATES PATENTS

| | | |
|---|---|---|
| 1,906,691 | Lilienfeld | May 2, 1933 |
| 2,005,279 | Van Geel | June 18, 1935 |
| 2,224,307 | Linder | Dec. 10, 1940 |
| 2,285,136 | Abendroth | June 2, 1942 |
| 2,299,228 | Gray | Oct. 20, 1942 |
| 2,299,667 | Waterman | Oct. 20, 1942 |
| 2,307,561 | Bailey | Jan. 5, 1943 |
| 2,623,101 | Kurland | Dec. 23, 1952 |
| 2,936,514 | Millard | May 17, 1960 |

FOREIGN PATENTS

| | | |
|---|---|---|
| 462,392 | Canada | Jan. 10, 1950 |
| 160,620 | Australia | Feb. 4, 1954 |